United States Patent
Xiao et al.

(10) Patent No.: US 7,895,250 B2
(45) Date of Patent: Feb. 22, 2011

(54) FIXED POINT INTEGER DIVISION TECHNIQUES FOR AC/DC PREDICTION IN VIDEO CODING DEVICES

(75) Inventors: Shu Xiao, San Diego, CA (US); Junchen Du, San Diego, CA (US); Tao Shen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1673 days.

(21) Appl. No.: 11/137,069

(22) Filed: May 25, 2005

(65) Prior Publication Data

US 2006/0282237 A1 Dec. 14, 2006

(51) Int. Cl.
G06F 7/38 (2006.01)
(52) U.S. Cl. .......................... 708/235; 708/650; 703/2; 382/232; 382/238
(58) Field of Classification Search .............. None
See application file for complete search history.

(56) References Cited

U.S. PATENT DOCUMENTS 6,842,219 B2 * 1/2005 Lee ........................ 352/244

7,280,595 B1 * 10/2007 Lin ...................... 375/240.03
2003/0035587 A1 2/2003 Youn

FOREIGN PATENT DOCUMENTS

WO 03014914 A1 2/2003

* cited by examiner

Primary Examiner—Lewis A Bullock, Jr
Assistant Examiner—Michael Yaary
(74) Attorney, Agent, or Firm—Timothy F. Loomis; John Rickenbrode

(57) ABSTRACT

The disclosure describes a method for performing a fixed point calculation of a floating point operation (A // B) in a coding device, wherein A // B represents integer division of A divided by B rounded to a nearest integer. The method may comprise selecting an entry from a lookup table (LUT) having entries generated as an inverse function of an index B, wherein B defines a range of values that includes every DC scalar value and every quantization parameter associated with a coding standard, and calculating A // B for coding according to the coding standard based on values A, B1 and B2, wherein B1 and B2 comprise high and low portions of the selected entry of the LUT. The techniques may simplify digital signal processor (DSP) implementations of video coders, and are specifically useful for MPEG-4 coders and possibly others.

28 Claims, 5 Drawing Sheets

FIXED POINT INTEGER DIVISION TECHNIQUES FOR AC/DC PREDICTION IN VIDEO CODING DEVICES

TECHNICAL FIELD

This disclosure relates to video coding and, more particularly, AC/DC prediction such as that used for intra-coding in the MPEG-4 standard and other video coding standards.

BACKGROUND

Digital video capabilities can be incorporated into a wide range of devices, including digital televisions, digital direct broadcast systems, wireless communication devices, personal digital assistants (PDAs), laptop computers, desktop computers, digital cameras, digital recording devices, cellular or satellite radio telephones, and the like. Digital video devices can provide significant improvements over conventional analog video systems in creating, modifying, transmitting, storing, recording and playing full motion video sequences.

A number of different video coding standards have been established for encoding and decoding digital video sequences. The Moving Picture Experts Group (MPEG), for example, has developed a number of coding standards including MPEG-1, MPEG-2 and MPEG-4. Other standards include the International Telecommunication Union (ITU) H.263 standard, QuickTime™ technology developed by Apple Computer of Cupertino Calif., Video for Windows™ and Windows™ media developed by Microsoft Corporation of Redmond, Wash., Indeo™ developed by Intel Corporation, RealVideo™ from RealNetworks, Inc. of Seattle, Wash., and Cinepak™ developed by SuperMac, Inc. Updated versions of these standards as well as new standards continue to emerge and evolve, including the ITU H.264 standard and a number of proprietary standards. Many image coding standards have also been developed for compression of still images, such as the JPEG standard. JPEG stands for "Joint Photographic Experts Group," which is a standardization committee.

Some coding standards may make use of what is referred to as "AC/DC prediction." AC/DC prediction is also sometimes referred to as "intra-prediction" and is generally the prediction process associated with intra-coding. For example, AC/DC prediction involves the prediction process of identifying another video block within a given video frame or image to be used in intra-coding to exploit redundancy within the given video frame or image to achieve data compression. In other words, intra-coding is generally an intra-frame or intra-image process of compressing the amount of data needed to code the video frame or image, and AC/DC prediction is the process of identifying which neighboring video block should be used to intra-code a current video block.

Intra-coding may be used alone as a compression technique, such as for still image compression, but is more commonly implemented along with other video coding techniques in the compression of video sequences. For example, intra-coding may be used in conjunction with inter-frame coding techniques that utilize similarities between successive video frames, referred to as temporal or inter-frame correlation. When intra-coding is used with inter-frame compression, video sequences can be compressed more than when inter-frame compression is used exclusively.

For intra-coding, the coder may utilize a mode-selection engine, which selects the desired mode for AC/DC prediction. Most video coding standards allow for at least two possible AC/DC prediction modes, including an AC prediction mode and a DC prediction mode. DC prediction refers to intra video block prediction that uses only the DC coefficient of video blocks (typically the upper left coefficient which may represent the zero frequency value of a video block or average value of a video block). AC prediction refers to intra video block prediction that uses some or all of the AC coefficients of a video block, which are the remaining (non-DC) coefficients of the video block.

SUMMARY

This disclosure describes techniques implemented by a video coding device during AC/DC prediction. The techniques are useful to allow a coding device that functions with fixed point operations, such as a video coder implemented in a digital signal processor (DSP), to accurately estimate the floating point operations used in AC/DC prediction. More specifically, the techniques involve an accurate fixed point calculation of a floating point operation (A // B) in a coding device for all possible input parameters of the operation that may be encountered in AC/DC prediction, wherein A // B represents integer division of A divided by B rounded to a nearest integer. Half-integer values are rounded away from zero.

The described techniques may involve the generation of a lookup table (LUT) having entries that are an inverse function of an index B, wherein B defines a range of values that includes every DC scalar value and every quantization parameter associated with a coding standard. For the MPEG-4 standard, for example, B may have a range of [1, 46], which encompasses every DC scalar value and every quantization parameter associated with MPEG-4. In order to accurately estimate the floating point operation A // B, a selected entry of the LUT can be separated into components B1 and B2, which comprise high and low portions of the selected entry of the LUT. The fixed point calculation of the floating point operation (A // B) may comprise a result given by:

$$(((B1*A)<<1)+((B2*A)>>15)+32768)>>16$$

wherein << represents a left shift operation, >> represents a right shift operation and 32768 represents a constant to ensure the rounding to the nearest integer. Other equations that can further reduce the number of processing cycles needed to perform the computation in a digital signal processor (DSP) are also identified below.

In one embodiment, this disclosure describes a method for performing a fixed point calculation of a floating point operation (A // B) in a coding device, wherein A // B represents integer division of A divided by B rounded to a nearest integer. The method comprises selecting an entry from a lookup table (LUT) having entries generated as an inverse function of an index B, wherein B defines a range of values that includes every DC scalar value and every quantization parameter associated with a coding standard, and calculating A // B for coding according to the coding standard based on values A, B1 and B2, wherein B1 and B2 comprise high and low portions of the selected entry of the LUT.

In another embodiment, this disclosure describes a coding device comprising a lookup table (LUT) having entries generated as an inverse function of an index B, wherein the index B defines a range of values that includes every DC scalar value and every quantization parameter associated with a coding standard; and a fixed point calculation unit that performs a fixed point calculation of a floating point operation (A // B) for coding according to the coding standard based on values A, B1 and B2, wherein B1 and B2 comprise high and low portions of a selected entry of the LUT, and wherein A // B represents integer division of A divided by B rounded to a nearest integer.

These and other techniques described herein may be implemented in a coding device in hardware, software, firmware, or any combination thereof. If implemented in software, the software may be executed in a digital signal processor (DSP) or another device that performs fixed point operations. In that case, the software that executes the techniques may be initially stored in a computer readable medium and loaded and executed in the DSP for accurate fixed point calculation of a floating point operation in a coding device.

Additional details of various embodiments are set forth in the accompanying drawings and the description below. Other features, objects and advantages will become apparent from the description and drawings, and from the claims.

DETAILED DESCRIPTION

Figure 1:
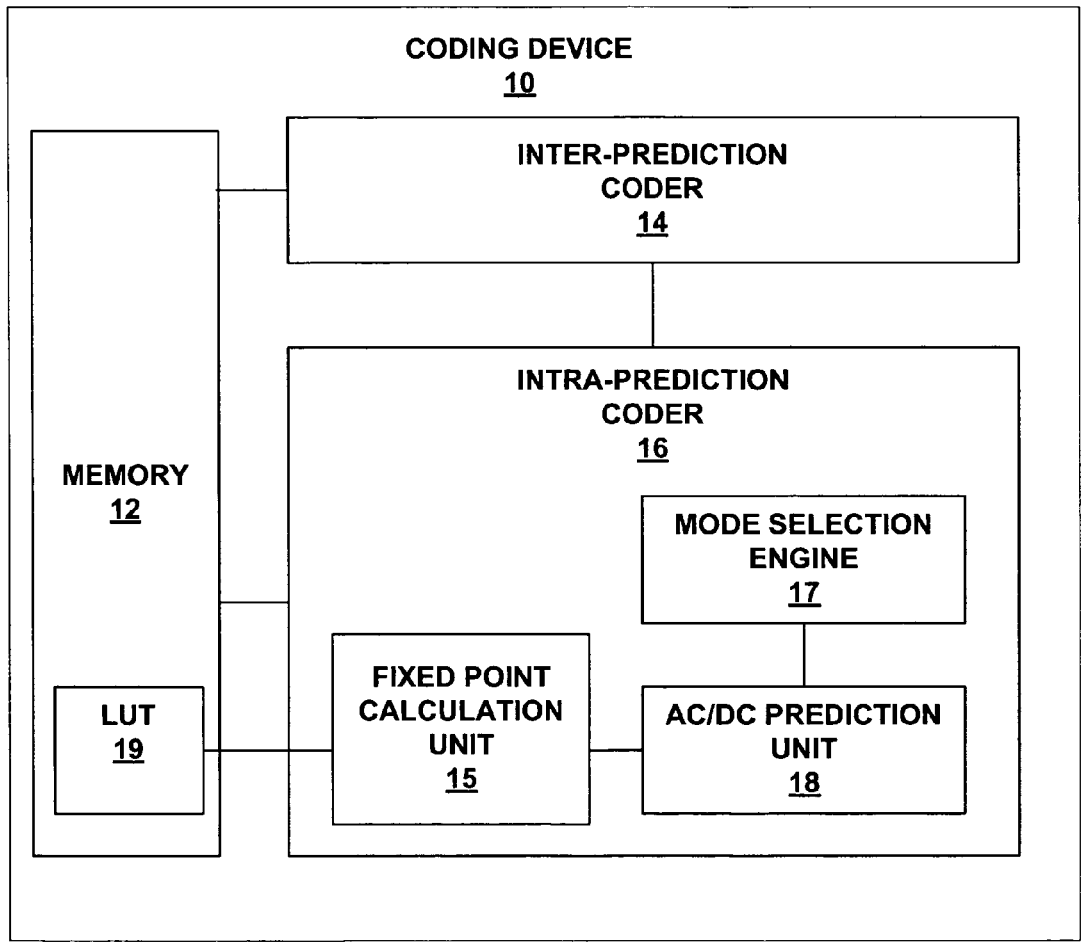
FIG. 1 is a block diagram of an exemplary coding device suitable for implementation of the techniques described herein.

This disclosure describes techniques implemented by a coding device during AC/DC prediction. AC/DC prediction is generally a process used in intra-coding techniques in which another video block within a given video frame or image is identified for use in intra-coding a current video block. The described techniques involve a fixed point calculation of a floating point operation (A // B) in a coding device, wherein A // B represents integer division of A divided by B rounded to a nearest integer. Half-integer values are rounded away from zero.

AC/DC prediction according to coding standards such as MPEG-4 and other standards requires an integer division floating point calculation (A // B) that can be difficult or costly (in terms of processing cycles) to duplicate in a fixed point device such as a digital signal processor (DSP). Importantly, the techniques described herein ensure accuracy of the calculation for every possible input combination that can be encountered during AC/DC prediction according to a video coding standard such as MPEG-4. This is very important for video coding because one wrong prediction can lead to error propagation that undermines the video coding. Also, relative to conventional techniques or implementations, the techniques described herein may reduce the number of processing cycles used by the DSP to generate the proper result of the floating point operation.

More specifically, the techniques involve an accurate fixed point calculation of a floating point operation (A // B) in a coding device for all possible input parameters of the operation that may be encountered in AC/DC prediction, wherein A // B represents integer division of A divided by B rounded to a nearest integer. For example, 3 // 2 is rounded to 2, while −3 // 2 is rounded to −2. The techniques may be used for DC prediction, in which case A represents the unquantized DC coefficient of a video block to be coded and B represents the DC scalar value used to quantize the DC coefficient. In addition, the same techniques may also be used for AC prediction, in which case A represents the product of a quantized AC coefficient and the quantization parameter of a candidate prediction block and B represents the quantization parameter of the video block to be coded.

As described in greater detail below, a lookup table (LUT) is used in the calculation. The LUT has entries generated as an inverse function of an index B. The index B defines a range of values that includes every DC scalar value and every quantization parameter associated with a coding standard. For the MPEG-4 standard, for example, B may have a range of [1, 46], which encompasses every DC scalar value and every quantization parameter associated with MPEG-4. In particular, in MPEG-4, DC scalar values fall within a range of [8, 46] and quantization parameters fall within a range of [1,31]. Thus, an inverse LUT having values in the range of [1,46] encompasses all possible denominators for A // B computations in AC/DC prediction for MPEG-4.

In order to accurately estimate the result of the floating point operation A // B, a selected entry of the LUT can be separated into components B1 and B2, which comprise high and low portions of the selected entry of the LUT. The fixed point calculation of the floating point operation (A // B) may comprise a result given by:

$$(((B1*A)<<1)+((B2*A)>>15)+32768)>>16$$

in which << represents a left shift operation, >> represents a right shift operation and 32768 represents a constant to ensure rounding to the nearest integer.

Moreover, the calculations for some DSPs may be simplified by implementing the fixed point calculation of the floating point operation (A // B) as a result given by:

$$((B1*C)+((B2*C)>>16)+32768)>>16$$

in which << represents a left shift operation, >> represents a right shift operation, C represents (2*A), and 32768 represents a constant to ensure rounding to the nearest integer. These equations generally assume that a Q number associated with the LUT is Q31, which means that all values of the entries represent decimal values.

For other implementations of LUTs having smaller Q numbers such that some values of the entries are non-fractional, a more general equation may be used, such as:

$$(((B1*A)<<(32-Q_{Number}))+((B2*A)>>(Q_{Number}-16))+32768)>>16$$

or $$((B1*A)+((B2*A>>16)+(1<<(Q_{Number}-17))))>>(Q_{Number}-16)$$

Similarly as with Q number 31, for any Q number less than or equal to 28, the fixed-point DSP implementation could also be done as:

$$((B1*C)+((B2*C)>>16)+32768)>>16$$

which may be easier to implement in most DSPs.

FIG. 1 is a block diagram illustrating an exemplary coding device 10, which comprises a fixed point device. Coding device 10 generally refers to any coding device that uses AC/DC prediction as part of an intra-prediction coding technique. Thus, although device 10 is illustrated as including both an inter-prediction coder 14 and an intra-prediction coder 16, the techniques described herein are generally applicable to intra-prediction coder 16 and therefore may be implemented in coding devices that do not perform inter-prediction. For example, the techniques may also be used for image compression in digital cameras or other imaging devices. Coders 14, 16 are generally fixed point devices such as one or more DSPs.

In the example of FIG. 1, coding device 10 is a video coding device. Examples of video coding devices include digital televisions, digital video cameras, digital direct broadcast systems, wireless communication devices, personal digital assistants (PDAs), laptop computers, desktop computers, digital recording devices, cellular or satellite radio telephones, and the like. In general, any device that performs the coding techniques described herein may be a coding device. However, the techniques are most applicable to smaller devices that implement a digital signal processor (DSP) or another device that does not perform floating point computations.

As illustrated in FIG. 1, coding device 10 includes a memory 12 coupled to an intra-prediction coder 14 and an intra-prediction coder. Memory 12 may comprise any volatile or non-volatile storage elements. In some cases, memory 12 may include both on-chip and off-chip memory. For example, memory 12 may include a relatively large off-chip memory space that stores a video sequence, and a smaller and faster local on-chip memory used in the coding process. In that case, the off-chip memory may comprise dynamic random access memory (DRAM), or FLASH memory, and a local on-chip memory may comprise synchronous dynamic random access memory (SDRAM). For simplicity, however, a single memory 12 is illustrated to represent any number of memory elements that can be used to facilitate video coding.

Each of coders 14 and 16 may form part of an integrated encoder/decoder (CODEC), or may comprise encoding or decoding elements only. In any case, coders 14 and 16 may be implemented collectively or separately within hardware, software, firmware, one or more digital signal processors (DSPs), microprocessors, application specific integrated circuits (ASICs), field programmable gate arrays (FPGAs), discrete hardware components, or various combinations thereof. Coders 14 and 16 at least partially comprise a fixed point device, such as a DSP, such that the techniques described herein for computing floating point operations in a fixed point manner are applicable.

Inter-prediction coder 14 generally refers to the coding elements that perform inter-frame correlation for video sequence compression. Inter-prediction coder 14, for example, may perform motion estimation and motion compensation techniques in order to achieve inter-frame compression of a video sequence. Motion estimation refers to a process of comparing a current video block to video blocks of other frames in order to identify a "best prediction" video block. Once the "best prediction" is identified for a current video block during motion estimation, inter-frame coder 14 can code the differences between the current video block and the best prediction using motion compensation. Motion compensation comprises a process of creating a difference block indicative of the differences between the current video block to be coded and the best prediction. In particular, motion compensation usually refers to the act of fetching the best prediction block using a motion vector, and then subtracting the best prediction from an input block to generate a difference block. The difference block typically includes substantially less data than the original video block represented by the difference block.

After motion compensation has created the difference block, a series of additional coding steps can also be performed by inter-prediction coder 14 to further code the difference block and further compress the data. These additional coding steps may depend on the coding standard being used. In MPEG-4 compliant coders, for example, the additional coding steps may include an 8×8 discrete cosine transform, followed by scalar quantization, followed by a raster-to-zigzag reordering, followed by run-length encoding, followed by Huffman encoding. A coded difference block can be transmitted by coding device 10 (the transmitter is not illustrated for simplicity) along with a motion vector that indicates which video block from the previous frame (or subsequent frame) was used for the coding.

Intra-prediction coder 16 comprises coding elements that perform intra-frame correlation to achieve intra-frame compression. Intra-prediction coder 16 may be used alone to achieve intra-frame or image compression, but is more commonly implemented along with inter-prediction coder 14 as an additional part of the compression of video sequences. For the coding of video sequences in compliance with MPEG-4, intra-prediction coder 16 may be invoked after scalar quantization and prior to the raster-to-zigzag reordering. Again, the intra-prediction process includes an AC/DC prediction process of identifying a neighboring video block to be used in the intra-coding, followed by a coding step that uses the identified video block for intra-frame compression. The techniques described herein are applicable to the AC/DC prediction process performed by intra-prediction coder 16.

Intra-prediction coder 16 includes a mode selection engine 17 that selects the mode to be used for AC/DC prediction, e.g., selects an AC mode or a DC mode for the prediction. AC/DC prediction unit 18 then performs AC prediction or DC prediction, depending upon the mode that was selected. Moreover, in accordance with this disclosure, AC/DC prediction unit 18 invokes fixed point calculation unit 15 in order to efficiently and effectively perform the floating point operation of integer division rounded to the nearest integer in a fixed point device. As described herein, fixed point calculation unit 15 selects entries from lookup table (LUT) 19, which may be stored in memory 12, and applies an equation that ensures that the fixed point calculation perfectly matches the result of a floating point operation for the input parameters associated with AC/DC prediction. In this manner, coding device 10 is implemented as a fixed point device, such as a DSP, but is able to efficiently and effectively calculate the results of a floating point operation needed for AC/DC prediction.

The potential modes that may be selected by mode selection engine 17 may differ according to different video coding standards. According to MPEG-4, two general modes exist, a DC mode, an AC mode. In addition, each mode may have a horizontal and vertical direction. The DC mode utilizes DC coefficients only, whereas the AC mode may utilize DC and AC coefficients. The AC mode may alternatively be referred to as AC+DC mode as the DC coefficient and AC coefficients are used.

In one relatively simple example, a vertical mode is used if the DC difference between blocks B and A (see FIG. 2) is smaller than the DC difference between blocks B and C. A horizontal mode is used if the DC difference between blocks B and C is smaller than the DC difference between blocks B and A (see FIG. 2). Once the direction of motion is determined, the decision whether to use DC only mode or to use AC+DC mode in the selected direction can be determined for encoding based which mode is best for a given situation. These mode selections, however, are subject to a number of variations. For decoding, the mode will be identified by a bit or flag in the bit stream. Generally, any mode may be used for intra-prediction, but by selecting a specific mode in certain instances, the quality of the intra-coding process can be improved. Again, the techniques described herein may allow for fixed point computations of all possible floating point operations that may be encountered in AC/DC prediction.

Figure 2:
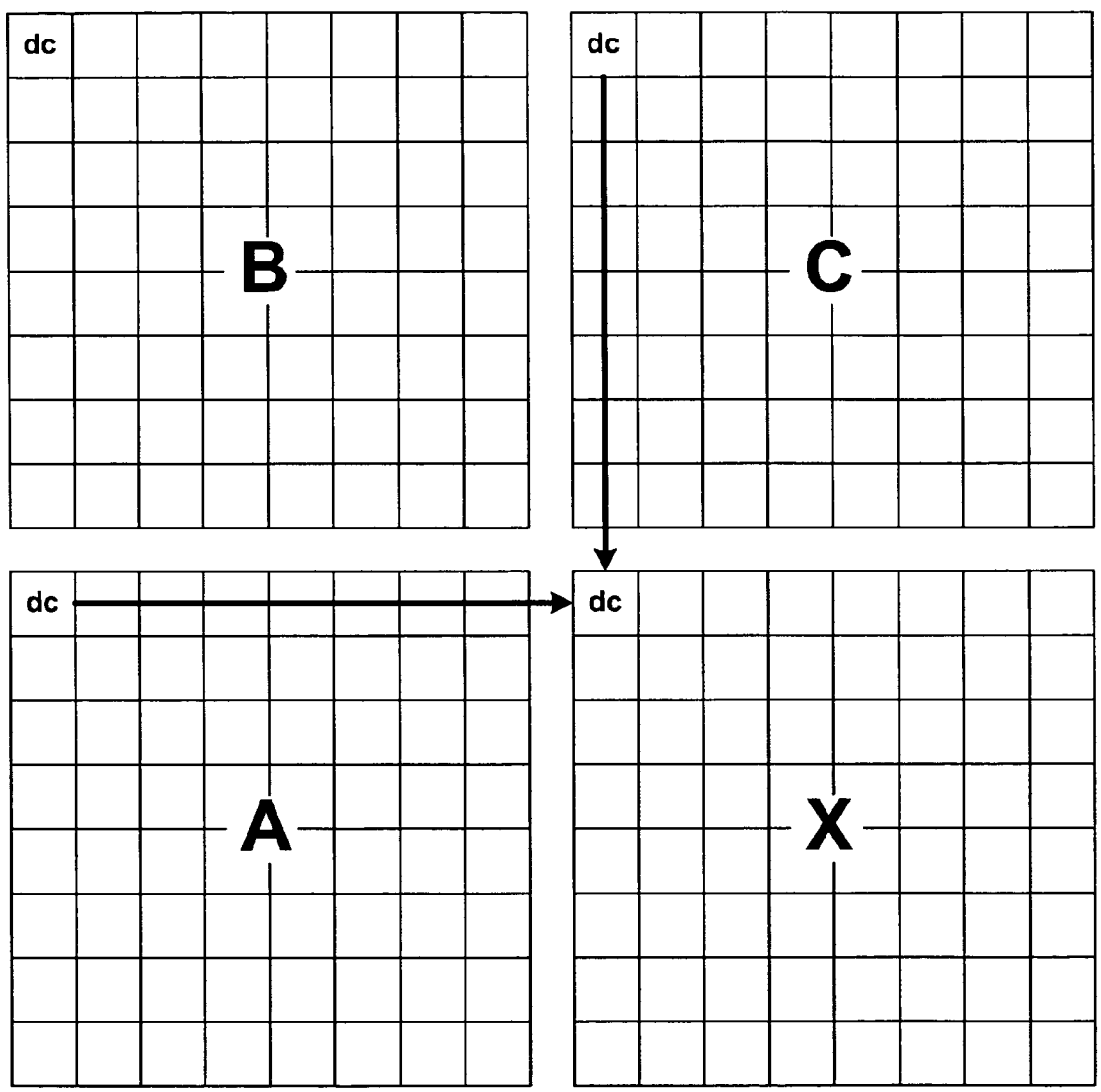
FIG. 2 is a conceptual diagram of video blocks to illustrate DC prediction.

FIG. 2 is a conceptual diagram of video blocks to illustrate DC prediction. In this example, mode selection engine 17 may have selected a DC mode as the mode to be used for intra-prediction. As shown in FIG. 2, AC/DC prediction unit 18 performs DC prediction based on the DC component of one of the neighboring video blocks A or C. In DC prediction according to MPEG-4, the computation F[0][0] // dc_scalar is performed, wherein F[0][0] is the unquantized coefficient for DC and dc_scalar is the DC scalar value used to quantize the coefficient F[0][0]. By saturation check, F[0][0] is in the range of [−2048, 2047] for MPEG-4, and dc_scalar is the range of [8, 46].

LUT 19 stores entries that include an inverse function of all possible values of dc_scalar. Fixed point calculation unit 15 selects the appropriate entry from LUT 19 corresponding to the dc_scalar being used. Fixed point calculation unit 15 then applies the selected entry with the coefficient F[0][0] according to an equation that separates the lower half of the selected entry and the upper half of the selected entry in order to simplify the overall computation. In this case, for example, fixed point calculation unit 15 may apply an equation such as:

$$(((B1*F[0][0])<<1)+((B2*F[0][0])>>15)+32768)>>16$$

in order to achieve the result of F[0][0] // dc_scalar. In this equation, B1 and B2 represent the lower half of the selected entry and the upper half of the selected entry respectively, << represents a left shift operation, >> represents a right shift operation and 32768 represents a constant to ensure the rounding to the nearest integer.

Figure 3:
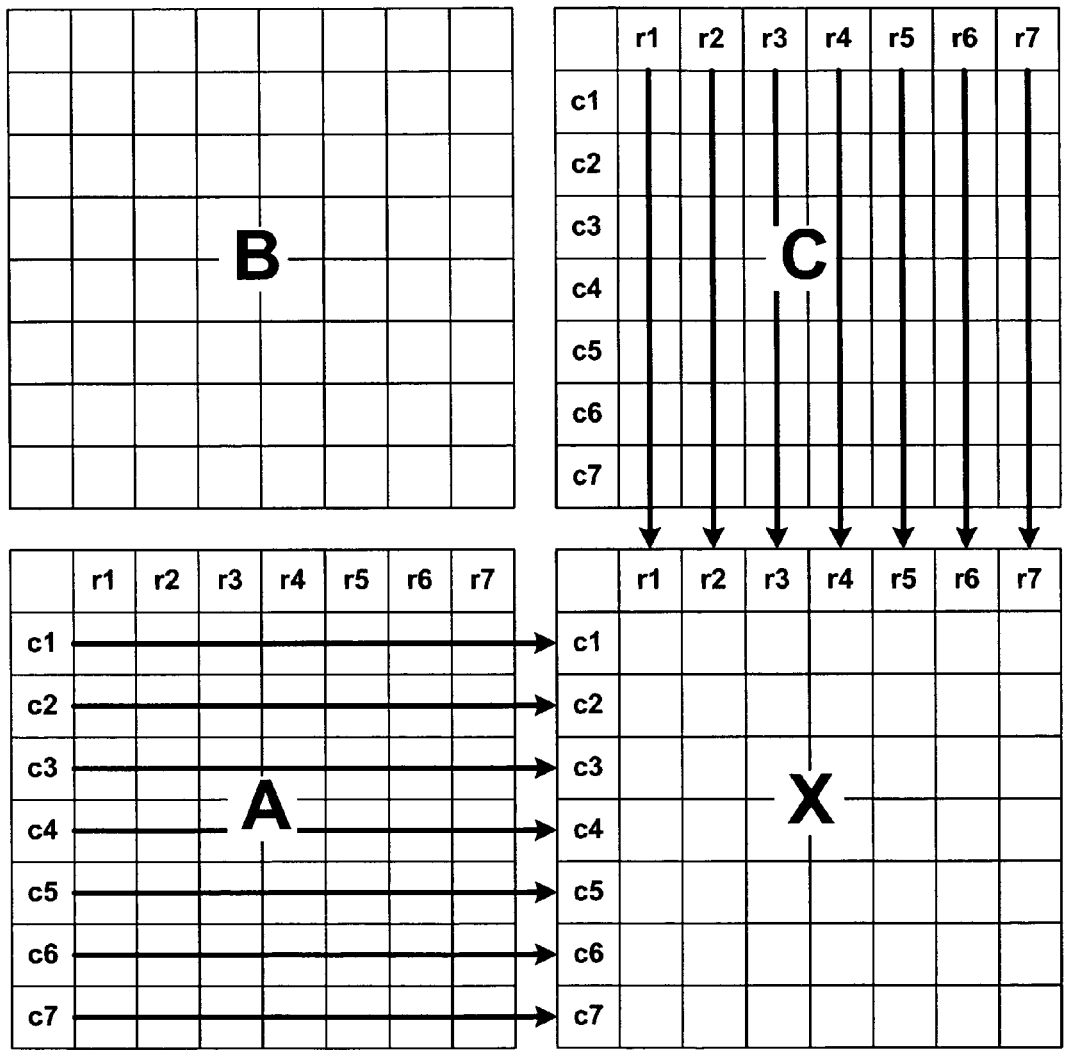
FIG. 3 is a conceptual diagram of video blocks to illustrate AC prediction.

LUT 19 stores inverse entries that correspond not only to the inverse function of all possible values of dc_scalar, but also to the inverse function of all possible entries of quantization parameters that may be used according to the coding standard. For MPEG-4, the quantization parameters have a range of [1, 31]. Thus, if LUT 19 stores inverse entries that span a range of [1, 46], LUT 19 may represent inverse entries that correspond all possible values of dc_scalar and all possible values of the quantization parameter. Therefore, the same LUT 19 may be invoked to mimic the floating point calculation for AC prediction and DC prediction FIG. 3 is a conceptual diagram of video blocks to illustrate AC prediction, e.g., the AC portion of AC+DC prediction. In this example, mode selection engine 17 has selected an AC mode as the mode to be used for intra-prediction. As shown in FIG. 3, AC/DC prediction unit 18 performs AC prediction based on either the vertical AC components c1-c7 of block A or the horizontal AC components r1-r7 of block C. Again, the DC component may also be used for AC+DC prediction, but this is shown separately in FIG. 2 for simplicity.

In AC prediction according to MPEG-4, the computation $(QF_P*QP_P) // QP_X$ is performed for each AC coefficient of the prediction video block. Again, if video block A (FIG. 3) is used for the prediction, the AC coefficients used are c1-c7 of block A and if block B is used for the prediction, the AC coefficients r1-r7 of block B are used for the prediction. $QF_P$ represents a given quantized AC coefficient of the block being used for the prediction and $QP_P$ represents quantization parameter associated with the block being used. The product $(QF_P*QP_P)$ is not quite the same as the unquantized AC coefficients, but as the MPEG-4 standard specifies, this value is constrained by half of unquantized AC coefficients, which can be sufficiently included in the range of [−2048, 2047]. $QP_X$ represents the quantization parameter associated with block X (FIG. 3) to be coded and falls within the range [1, 31] according to MPEG-4.

Because LUT 19 stores entries that include an inverse function of all possible values of $QP_X$, fixed point calculation unit 15 selects the appropriate entry from LUT 19 corresponding the $QP_X$ being used. Fixed point calculation unit 15 then applies the selected entry with the product $(QF_P*QP_P)$ according to an equation that separates the lower half of the selected entry and the upper half of the selected entry in order to simplify the overall computation. In this case, for example, fixed point calculation unit 15 may apply an equation such as:

$$(((B1*(QF_P*QP_P))<<1)+((B2*(QF_P*QP_P))>>15)+32768)>>16$$

in order to achieve the result of $(QF_P*QP_P) // QP_X$. In this equation, B1 and B2 represent the lower half of the selected entry and the upper half of the selected entry, respectively, << represents a left shift operation, >> represents a right shift operation, and 32768 represents a constant to ensure the rounding to the nearest integer.

In general, the goal of the techniques described herein is to facilitate a good fixed point approximation of inverse numbers for the computation of "A // B" with number A in the range of [−2048, 2047] and number B in the range of [1, 46]. Again, the techniques can also simplify such a computation and possibly reduce the number of processing cycles needed to perform the computation in a fixed point device.

LUT 19 may define a Q Number corresponding to Q31, which means that all values of the entries of LUT 19 correspond to fractional values. Each entry in the table is calculated as floor (2^31/B)+1, where B is the index of the table and is in the range of [1, 46]. The operation "floor" represents an operation for rounding down to an integer. The table may be generated using the following exemplary pseudo-code:

```
unsigned int q31Num, i ;         /* defines unsigned integer */
unsigned int vInverseTable[46];  /* defines an array */
    q31Num = 1<<31;              /* performs 2^31 */
    for (i=1; i <=46; i++)       /* iterates to generate each entry */
    {
        vInverseTable[i−1] = q31Num/i + 1;
    }
```

A simulated example of the generation of LUT 19 is as follows:

vEncInverseTable[46]= {
    0x80000001,0x40000001,0x2AAAAAAB,0x20000001,0x1999999a,
    0x15555556,0x12492493,0x10000001,0x0E38E38f,0x0CCCCCCD,
    0x0BA2E8BB,0x0AAAAAAB,0x09D89D8A,0x0924924A,0x08888889,
    0x08000001,0x07878788,0x071C71C8,0x06BCA1B0,0x06666667,
    0x06186187,0x05D1745E,0x0590B217,0x05555556,0x051EB852, -continued

```
0x04EC4EC5,0x04BDA130,0x04924925,0x0469EE59,0x04444445,
0x04210843,0x04000001,0x03E0F83F,0x03C3C3C4,0x03A83A84,
0x038E38E4,0x03759F23,0x035E50D8,0x03483484,0x03333334,
0x031F3832,0x030C30C4,0x02FA0BE9,0x02E8BA2F,0x02D82D83,
0x02C8590C};
```

Simulations have shown that for every possible number of numerator ([−2048, 2047]) and denominator ([1, 46]), the results using the inverse table and equations described herein match a corresponding floating point calculation for all possible combinations of the numerator and denominator in these ranges. The inverse table and equations described herein are therefore accurate for purposes of ACDC prediction according to MPEG-4. Again, the fixed point calculation of the floating point operation (A // B) may comprise a result given by:

$$(((B1*A)<<1)+((B2*A)>>15)+32768)>>16$$

wherein << represents a left shift operation, >> represents a right shift operation and 32768 represents a constant to ensure the rounding to the nearest integer.

Moreover, the calculations for some DSPs may be simplified by implementing the fixed point calculation of the floating point operation (A // B) as a result given by:

$$((B1*C)+((B2*C)>>16)+32768)>>16$$

wherein << represents a left shift operation, >> represents a right shift operation, C represents (2*A), and 32768 represents a constant to ensure the rounding to the nearest integer. Because C=2*A is within 16 bit ([−4096, 4094]), there is no precision loss due to *2. Moreover, C=2*A may be generated during free cycles in some DSPs. These equations generally assume that a Q number associated with the LUT is Q31, which means that all values of the entries represent decimal values.

The following are examples of inverse tables that may be used with Q Numbers Q30-Q18 with the range of numerator ([−2048, 2047]) and denominator ([1, 46]). These tables might be useful for different DSPs and different instruction sets.

```
vEncInverseTable_Q30 = {
    0x40000001,0x20000001,0x15555556,0x10000001,0xcccccccd,
    0xaaaaaab,0x924924a,0x8000001,0x71c71c8,0x6666667,
    0x5d1745e,0x5555556,0x4ec4ec5,0x4924925,0x4444445,
    0x4000001,0x3c3c3c4,0x38e38e4,0x35e50d8,0x3333334,
    0x30c30c4,0x2e8ba2f,0x2c8590c,0x2aaaaab,0x28f5c29,
    0x2762763,0x25ed098,0x2492493,0x234f72d,0x2222223,
    0x2108422,0x2000001,0x1f07c20,0x1e1e1e2,0x1d41d42,
    0x1c71c72,0x1bacf92,0x1af286c,0x1a41a42,0x199999a,
    0x18f9c19,0x1861862,0x17d05f5,0x1745d18,0x16c16c2,
    0x1642c86 };
vEncInverseTable_Q29 = {
    0x20000001,0x10000001,0xaaaaaab,0x8000001,0x6666667,
    0x5555556,0x4924925,0x4000001,0x38e38e4,0x3333334,
    0x2e8ba2f,0x2aaaaab,0x2762763,0x2492493,0x2222223,
    0x2000001,0x1e1e1e2,0x1c71c72,0x1af286c,0x199999a,
    0x1861862,0x1745d18,0x1642c86,0x1555556,0x147ae15,
    0x13b13c2,0x12f684c,0x124924a,0x11a7b97,0x1111112,
    0x1084211,0x1000001,0xf83e10,0xf0f10f1,0xea0ea1,
    0xe38e39,0xdd67c9,0xd79436,0xd20d21,0xcccccccd,
    0xc7ce0d,0xc30c31,0xbe82fb,0xba2e8c,0xb60b61,
    0xb21643 };
vEncInverseTable_Q28 = {
    0x10000001,0x8000001,0x5555556,0x4000001,0x3333334,
    0x2aaaaab,0x2492493,0x2000001,0x1c71c72,0x199999a,
    0x1745d18,0x1555556,0x13b13b2,0x124924a,0x1111112,
    0x1000001,0xf0f0f1,0xe38e39,0xd79436,0xcccccccd,
    0xc30c31,0xba2e8c,0xb21643,0xaaaaaab,0xa3d70b,
    0x9d89d9,0x97b426,0x924925,0x8d3dcc,0x888889,
    0x842109,0x800001,0x7c1f08,0x787879,0x750751,
    0x71c71d,0x6eb3e5,0x6bca1b,0x690691,0x666667,
    0x63e707,0x618619,0x5f417e,0x5d1746,0x5b05b1,
    0x590b22 };
vEncInverseTable_Q27 = {
    0x8000001,0x4000001,0x2aaaaab,0x2000001,0x199999a,
    0x1555556,0x124924a,0x1000001,0xe38e39,0xcccccccd,
    0xba2e8c,0xaaaaaab,0x9d89d9,0x924925,0x888889,
    0x800001,0x787879,0x71c71d,0x6bca1b,0x666667,
    0x618619,0x5d1746,0x590b22,0x555556,0x51eb86,
    0x4ec4ed,0x4bda13,0x492493,0x469ee6,0x444445,
    0x421085,0x400001,0x3e0f84,0x3c3c3d,0x3a83a9,
    0x38e38f,0x3759f3,0x35e50e,0x348349,0x333334,
    0x31f384,0x30c30d,0x2fa0bf,0x2e8ba3,0x2d82d9,
    0x2c8591 };
vEncInverseTable_Q26 = {
    0x4000001,0x2000001,0x1555556,0x1000001,0xcccccccd,
    0xaaaaaab,0x924925,0x800001,0x71c71d,0x666667,
    0x5d1746,0x555556,0x4ec4ed,0x492493,0x444445,
    0x400001,0x3c3c3d,0x38e38f,0x35e50e,0x333334,
    0x30c30d,0x2e8ba3,0x2c8591,0x2aaaaab,0x28f5c3,
    0x276277,0x25ed0a,0x24924a,0x234f73,0x222223,
    0x210843,0x200001,0x1f07c2,0x1e1e1f,0x1d41d5,
    0x1c71c8,0x1bacfa,0x1af287,0x1a41a5,0x19999a,
    0x18f9c2,0x186187,0x17d060,0x1745d2,0x16c16d,
    0x1642c9 };
vEncInverseTable_Q25 = {
    0x2000001,0x1000001,0xaaaaaab,0x800001,0x666667,
    0x555556,0x492493,0x400001,0x38e38f,0x333334,
    0x2e8ba3,0x2aaaaab,0x276277,0x24924a,0x222223,
    0x200001,0x1e1e1f,0x1c71c8,0x1af287,0x19999a,
    0x186187,0x1745d2,0x1642c9,0x155556,0x147ae2,
    0x13b13c,0x12f685,0x124925,0x11a7ba,0x111112,
    0x108422,0x100001,0xf83e1,0xf0f10,0xea0eb,
    0xe38e4,0xdd67d,0xd7944,0xd20d3,0xcccccd,
    0xc7ce1,0xc30c4,0xbe830,0xba2e9,0xb60b7,
    0xb2165 };
vEncInverseTable_Q24 = {
    0x1000001,0x800001,0x555556,0x400001,0x333334,
    0x2aaaaab,0x24924a,0x200001,0x1c71c8,0x19999a,
    0x1745d2,0x155556,0x13b13c,0x124925,0x111112,
    0x100001,0xf0f10,0xe38e4,0xd7944,0xcccccd,
    0xc30c4,0xba2e9,0xb2165,0xaaaaab,0xa3d71,
    0x9d89e,0x97b43,0x92493,0x8d3dd,0x88889,
    0x84211,0x80001,0x7c1f1,0x78788,0x75076,
    0x71c72,0x6eb3f,0x6bca2,0x6906a,0x66667,
    0x63e71,0x61862,0x5f418,0x5d175,0x5b05c,
    0x590b3 };
vEncInverseTable_Q23 = {
    0x800001,0x400001,0x2aaaaab,0x200001,0x19999a,
    0x155556,0x124925,0x100001,0xe38e4,0xcccccd,
    0xba2e9,0xaaaaab,0x9d89e,0x92493,0x88889,
    0x80001,0x78788,0x71c72,0x6bca2,0x66667,
    0x61862,0x5d175,0x590b3,0x55556,0x51eb9,
    0x4ec4f,0x4bda2,0x4924a,0x469ef,0x44445,
    0x42109,0x40001,0x3e0f9,0x3c3c4,0x3a83b,
    0x38e39,0x375a0,0x35e51,0x34835,0x33334,
    0x31f39,0x30c31,0x2fa0c,0x2e8bb,0x2d82e,
    0x2c85a };
vEncInverseTable_Q22 = {
    0x400001,0x200001,0x155556,0x100001,0xcccccd,
    0xaaaaab,0x92493,0x80001,0x71c72,0x66667,
    0x5d175,0x55556,0x4ec4f,0x4924a,0x44445,
    0x40001,0x3c3c4,0x38e39,0x35e51,0x33334,
```

-continued

```
  0x30c31,0x2e8bb,0x2c85a,0x2aaab,0x28f5d,
  0x27628,0x25ed1,0x24925,0x234f8,0x22223,
  0x21085,0x20001,0x1f07d,0x1e1e2,0x1d41e,
  0x1c71d,0x1bad0,0x1af29,0x1a41b,0x1999a,
  0x18f9d,0x18619,0x17d06,0x1745e,0x16c17,
  0x1642d };
vEncInverseTable_Q21 = {
  0x200001,0x100001,0xaaaab,0x80001,0x66667,
  0x55556,0x4924a,0x40001,0x38e39,0x33334,
  0x2e8bb,0x2aaab,0x27628,0x24925,0x22223,
  0x20001,0x1e1e2,0x1c71d,0x1af29,0x1999a,
  0x18619,0x1745e,0x1642d,0x15556,0x147af,
  0x13b14,0x12f69,0x12493,0x11a7c,0x11112,
  0x10843,0x10001,0xf83f,0xf0f1,0xea0f,
  0xe38f,0xdd68,0xd795,0xd20e,0xcccd,
  0xc7cf,0xc30d,0xbe83,0xba2f,0xb60c,
  0xb217 };
vEncInverseTable_Q20 = {
  0x100001,0x80001,0x55556,0x40001,0x33334,
  0x2aaab,0x24925,0x20001,0x1c71d,0x1999a,
  0x1745e,0x15556,0x13b14,0x12493,0x11112,
  0x10001,0xf0f1,0xe38f,0xd795,0xcccd,
  0xc30d,0xba2f,0xb217,0xaaab,0xa3d8,
  0x9d8a,0x97b5,0x924a,0x8d3e,0x8889,
  0x8422,0x8001,0x7c20,0x7879,0x7508,
  0x71c8,0x6eb4,0x6bcb,0x6907,0x6667,
  0x63e8,0x6187,0x5f42,0x5d18,0x5b06,
  0x590c };
vEncInverseTable_Q19 = {
  0x80001,0x40001,0x2aaab,0x20001,0x1999a,
  0x15556,0x12493,0x10001,0xe38f,0xcccd,
  0xba2f,0xaaab,0x9d8a,0x924a,0x8889,
  0x8001,0x7879,0x71c8,0x6bcb,0x6667,
  0x6187,0x5d18,0x590c,0x5556,0x51ec,
  0x4ec5,0x4bdb,0x4925,0x469f,0x4445,
  0x4211,0x4001,0x3e10,0x3c3d,0x3a84,
  0x38e4,0x375a,0x35e6,0x3484,0x3334,
  0x31f4,0x30c4,0x2fa1,0x2e8c,0x2d83,
  0x2c86 };
vEncInverseTable_Q18 = {
  0x40001,0x20001,0x15556,0x10001,0xcccd,
  0xaaab,0x924a,0x8001,0x71c8,0x6667,
  0x5d18,0x5556,0x4ec5,0x4925,0x4445,
  0x4001,0x3c3d,0x38e4,0x35e6,0x3334,
  0x30c4,0x2e8c,0x2c86,0x2aab,0x28f6,
  0x2763,0x25ee,0x2493,0x2350,0x2223,
  0x2109,0x2001,0x1f08,0x1e1f,0x1d42,
  0x1c72,0x1bad,0x1af3,0x1a42,0x199a,
  0x18fa,0x1862,0x17d1,0x1746,0x16c2,
  0x1643 };
```

For these implementations of LUTs having smaller Q numbers such that some of values of the entries are non-fractional, a more general equation may be used such as:

$$(((B1*A) << (32 - Q_{Number})) + ((B2*A) >> (Q_{Number} - 16)) + 32768) >> 16$$

or $$((B1*A) + ((B2*A >> 16) + (1 << (Q_{Number} - 17)))) >> (Q_{Number} - 16)$$

Similarly, as with Q number 31, for any Q number less than or equal to 28, the fixed-point DSP implementation could also be done as:

$$((B1*C) + ((B2*C) >> 16) + 32768) >> 16$$

which is more programmer friendly for most DSPs.

Figure 4:
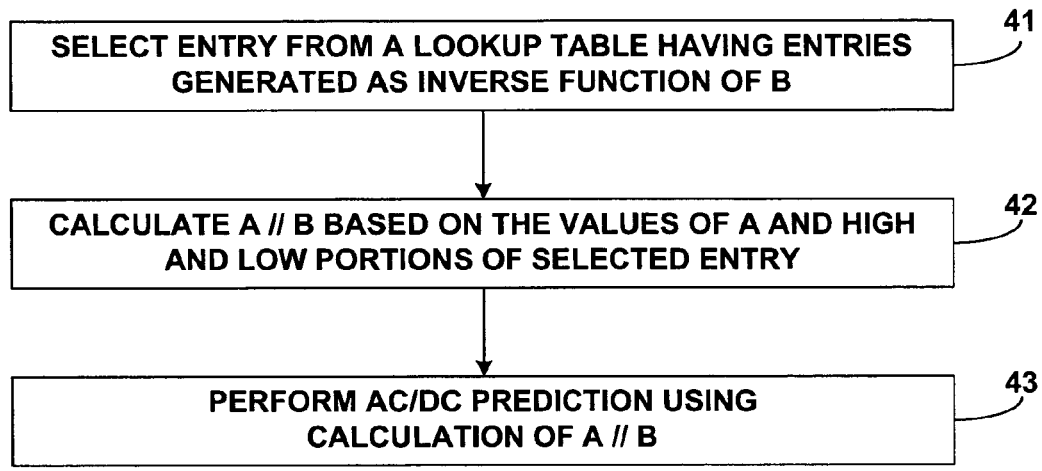
FIGS. 4-6 are flow diagrams according to embodiments of this disclosure.

FIG. 4 is a flow diagram illustrating a technique for performing a floating point calculation for AC/DC prediction in a fixed point device such as a DSP. As shown in FIG. 4, fixed point calculation unit 15 selects an entry from a lookup table (LUT) 19 having entries generated as an inverse function of B (41). Fixed point calculation unit 15 then calculates the integer division A // B based on values of A and high and low portions the selected entry (42). For example, fixed point calculation unit 15 may apply the equation:

$$(((B1*A) << 1) + ((B2*A) >> 15) + 32768) >> 16$$

wherein << represents a left shift operation, >>0 represents a right shift operation, 32768 represents a constant to ensure the rounding to the nearest integer, and B1 and B2 comprise high and low portions of the selected entry of the LUT respectively. AC/DC prediction unit 18 can then perform AC/DC prediction using the calculation of A // B (43).

Figure 5:
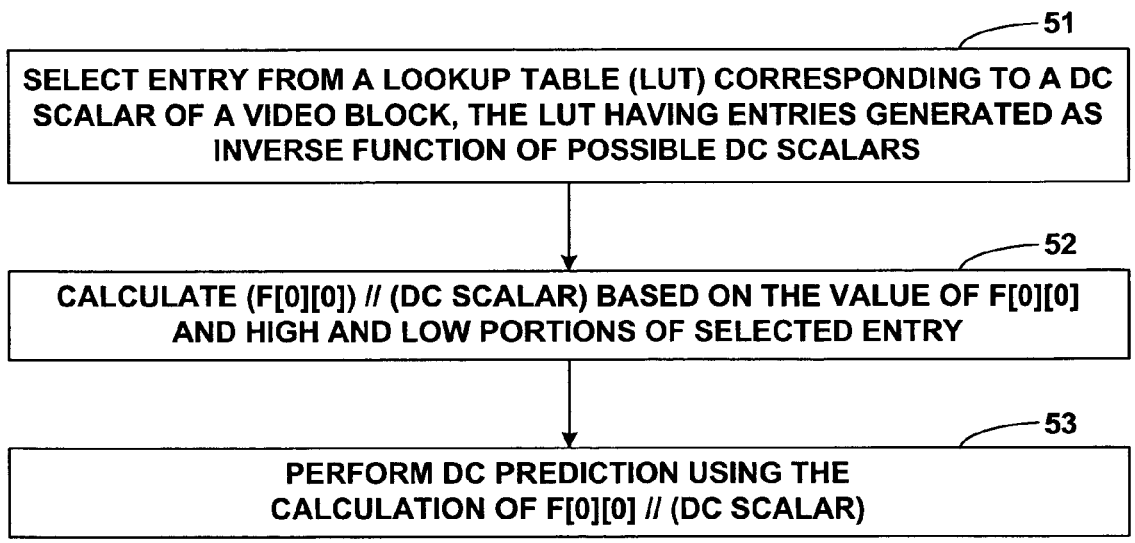

FIG. 5 is a flow diagram illustrating a more specific technique for performing a floating point calculation for DC prediction in a fixed point device such as a DSP. As shown in FIG. 5, fixed point calculation unit 15 selects and entry from a lookup table (LUT) 19 having entries generated as an inverse function of possible DC scalars (51). Fixed point calculation unit 15 then calculates the integer division F[0][0] (DC Scalar) based on the value the DC Scalar and high and low portions the selected entry (52). In this case, F[0][0] is the unquantized coefficient for DC and (DC Scalar) is the DC scalar value used to quantize the coefficient F[0][0].

For example, fixed point calculation unit 15 may apply the equation:

$$(((B1*F[0][0]) << 1) + ((B2*F[0][0]) >> 15) + 32768) >> 16$$

in order to achieve the result of F[0][0] // (DC Scalar). In this equation, B1 and B2 represent the lower half of the selected entry and the upper half of the selected entry, respectively, << represents a left shift operation, >> represents a right shift operation and 32768 represents a constant to ensure the rounding to the nearest integer. AC/DC prediction unit 18 can then perform DC prediction using the calculation of F[0][0] // (DC Scalar) (53).

Figure 6:
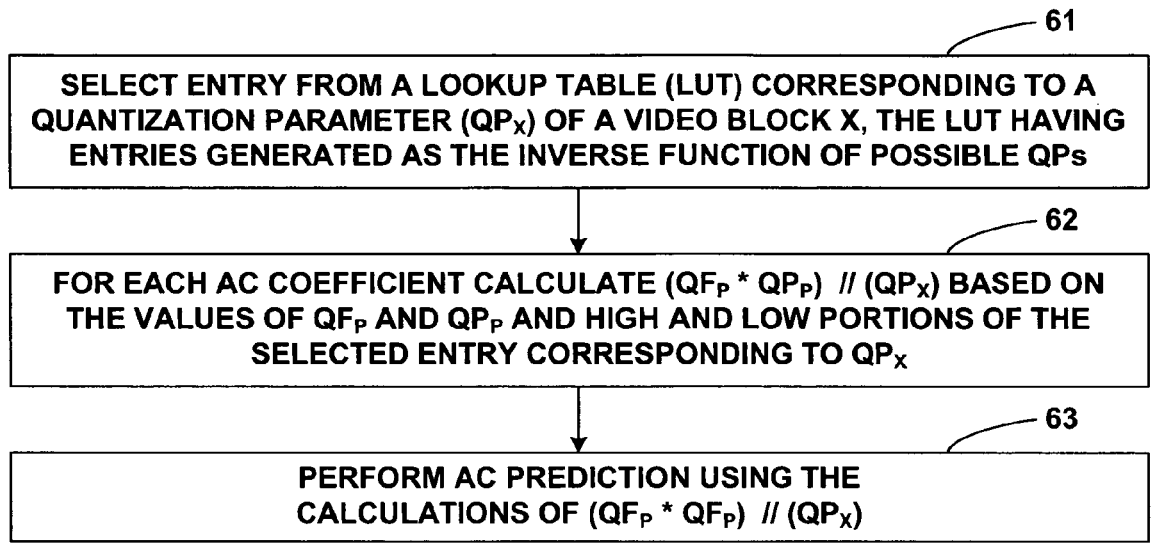

FIG. 6 is a flow diagram illustrating a more specific technique for performing a floating point calculation for AC prediction in a fixed point device such as a DSP. As shown in FIG. 6, fixed point calculation unit 15 selects and entry from a lookup table (LUT) 19 having entries generated as an inverse function of possible quantization parameters $QP_X$ of a video block X (61). For each AC coefficient used in the AC prediction, fixed point calculation unit then calculates the integer division $(QF_P*QP_P) // QP_X$ based on values of $QF_P$ and $QP_P$ and high and low portions high and low portions the selected entry corresponding to $QP_X$ (62). In this case, $QF_P$ represents a given quantized AC coefficient of the block being used for the prediction and $QP_X$ represents quantization parameter associated with the block being used.

For example, fixed point calculation unit 15 may apply the equation:

$$(((B1*(QF_P*QP_P)) << 1) + ((B2*(QF_P*QP_P)) >> 15) + 32768) >> 16$$

in order to achieve the result of $(QF_P*QP_P) // QP_X$. In this equation, B1 and B2 represent the lower half of the selected entry and the upper half of the selected entry respectively, << represents a left shift operation, >> represents a right shift operation and 32768 represents a constant to ensure the rounding to the nearest integer.

Compared with other approaches for simulating a floating point calculation with the accuracy needed over all respective inputs that may be encountered in MPEG-4 AC/DC prediction, the techniques described herein can significantly reduce the number of processing cycles of the DSP. Advantageously, the techniques described herein work without the need for a sign check or other pre-processing or post processing steps.

A number of different embodiments have been described. In particular, techniques for simulating a floating point calculation have been described that have accuracy needed over all respective inputs that may be encountered in MPEG-4 AC/DC prediction. Moreover, the techniques may reduce the number of processing cycles needed to perform such computations relative to other approaches. Nevertheless, various modifications may be made to the techniques described herein without departing from the spirit and scope of the invention. For example, the techniques may be adapted for use with other coding standards, e.g., by modifying the lookup table to encompass all possible inputs for such other standards. The techniques are generally described as being applicable to video coding, which means that the techniques may be applied for video encoding, video decoding, or both encoding and decoding.

The techniques described herein may be implemented in a coding device in hardware, software, firmware, or any combination thereof. If implemented in software, the software may be executed in a digital signal processor (DSP) or another device that performs fixed point operations. In that case, the software that executes the techniques may be initially stored in a computer readable medium and loaded and executed in the DSP for accurate fixed point calculation of a floating point operation in a coding device. For example, the computer readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, and the like. These and other embodiments are within the scope of the following claims.

The invention claimed is:

1. A coding device comprising:
a memory storing a lookup table (LUT) having entries generated as an inverse function of an index B, wherein the index B defines a range of values that includes every DC scalar value and every quantization parameter associated with a coding standard; and
a fixed point calculation unit that performs a fixed point calculation of a floating point operation (A // B) for coding according to the coding standard based on values A, B1 and B2, wherein B1 and B2 comprise high and low portions of a selected entry of the LUT, wherein A // B represents integer division of A divided by B rounded to a nearest integer, and
wherein the entries of the LUT are generated according to one of:

floor(2^31/B)+1 wherein floor represents an operation for rounding down to an integer.

2. The coding device of claim 1, wherein the coding device comprises a video coding device and the coding standard comprises an MPEG-4 video coding standard.

3. The coding device of claim 2, further comprising an AC/DC prediction unit that performs DC prediction according to the MPEG-4 standard using the fixed point calculation when B represents a DC scalar and performs AC prediction according to the MPEG-4 standard using the fixed point calculation when B represents a quantization parameter.

4. The coding device of claim 1, wherein B is in a range of [1, 46].

5. The coding device of claim 1, wherein the fixed point calculation of the floating point operation (A // B) comprises a result given by:

(((B1*A)<<1)+((B2*A)>>15)+32768)>>16 wherein << represents a left shift operation, >> represents a right shift operation and 32768 represents a constant to ensure the rounding to the nearest integer.

6. The coding device of claim 1, wherein the fixed point calculation of the floating point operation (A // B) comprises a result given by:

((B1*C)+((B2*C)>>16)+32768)>>16 wherein << represents a left shift operation, >> represents a right shift operation, C represents (2*A), and 32768 represents a constant to ensure the rounding to the nearest integer.

7. The coding device of claim 1, further comprising generating the LUT.

8. The coding device of claim 1, wherein a Q number associated with the LUT is Q31 such that all values of the entries represent decimal values.

9. A method for performing a fixed point calculation of a floating point operation (A // B) in a coding device, wherein A // B represents integer division of A divided by B rounded to a nearest integer, the method comprising:
selecting an entry from a lookup table (LUT) having entries generated as an inverse function of an index B, wherein B defines a range of values that includes every DC scalar value and every quantization parameter associated with a coding standard; and
calculating A // B for coding according to the coding standard based on values A, B1 and B2, wherein B1 and B2 comprise high and low portions of the selected entry of the LUT, and
wherein the entries of the LUT are generated according to:

floor(2^31/B)+1 wherein floor represents an operation for rounding down to an integer.

10. The method of claim 9, wherein the coding standard comprises an MPEG-4 video coding standard.

11. The method of claim 10, further comprising performing DC prediction according to the MPEG-4 standard using the fixed point calculation when B represents a DC scalar and performing AC prediction according to the MPEG-4 standard using the fixed point calculation when B represents a quantization parameter.

12. The method of claim 9, wherein B is in a range of [1, 46].

13. The method of claim 9, wherein the fixed point calculation of the floating point operation (A // B) comprises a result given by:

(((B1*A)<<1)+((B2*A)>>15)+32768)>>16 wherein << represents a left shift operation, >> represents a right shift operation and 32768 represents a constant to ensure the rounding to the nearest integer.

14. The method of claim 9, wherein the fixed point calculation of the floating point operation (A // B) comprises a result given by:

((B1*C)+((B2*C)>>16)+32768)>>16 wherein << represents a left shift operation, >> represents a right shift operation, C represents (2*A), and 32768 represents a constant to ensure the rounding to the nearest integer.

15. The method of claim 9, further comprising generating the LUT.

16. The method of claim 9, wherein a Q number associated with the LUT is Q31 such that all values of the entries represent decimal values.

17. A computer readable medium comprising instructions that when executed in a coding device cause the coding device to perform a fixed point calculation of a floating point operation (A // B), wherein A // B represents integer division of A divided by B rounded to a nearest integer, wherein the instructions when executed:
    select an entry from a lookup table (LUT) having entries generated as an inverse function of an index B, wherein B defines a range of values that includes every DC scalar value and every quantization parameter associated with a coding standard; and
    calculate A // B for coding according to the coding standard based on values A, B1 and B2, wherein B1 and B2 comprise high and low portions of the selected entry of the LUT, and
    wherein the entries of the LUT are generated according to:

floor(2^31/B)+1 wherein floor represents an operation for rounding down to an integer.

18. The computer readable medium of claim 17, wherein the coding standard comprises an MPEG-4 video coding standard.

19. The computer readable medium of claim 18, wherein the instructions when executed cause the coding device to perform DC prediction according to the MPEG-4 standard using the fixed point calculation when B represents a DC scalar and perform AC prediction according to the MPEG-4 standard using the fixed point calculation when B represents a quantization parameter.

20. The computer readable medium of claim 17, wherein B is in a range of [1, 46].

21. The computer readable medium of claim 17, wherein the fixed point calculation of the floating point operation (A // B) comprises a result given by:

(((B1*A)<<1)+((B2*A)>>15)+32768)>>16 wherein << represents a left shift operation, >> represents a right shift operation and 32768 represents a constant to ensure the rounding to the nearest integer.

22. The computer readable medium of claim 17, wherein the fixed point calculation of the floating point operation (A // B) comprises a result given by:

((B1*C)+((B2*C)>>16)+32768)>>16 wherein << represents a left shift operation, >> represents a right shift operation, C represents (2*A), and 32768 represents a constant to ensure the rounding to the nearest integer.

23. The computer readable medium of claim 17, wherein the instructions when executed generate the LUT.

24. The computer readable medium of claim 17, wherein a Q number associated with the LUT is Q31 such that all values of the entries represent decimal values.

25. A coding device comprising:
    a memory storing a lookup table (LUT) having entries generated as an inverse function of an index (B), wherein the index (B) defines a range of values that includes every DC scalar value and every quantization parameter associated with a coding standard; and
    means for performing a fixed point calculation of a floating point operation (A // B) for coding according to the coding standard based on values A, B1 and B2, wherein B1 and B2 comprise high and low portions of a selected entry of the LUT, wherein A // B represents integer division of A divided by B rounded to a nearest integer, and
    wherein the entries of the LUT are generated according to:

floor(2^Q-number/B)+1 wherein floor represents an operation for rounding down to an integer, and wherein Q-number represents an integer from 18 to 31.

26. The coding device of claim 25, further comprising means for performing DC prediction according to the MPEG-4 standard using the fixed point calculation when B represents a DC scalar and means for performing AC prediction according to the MPEG-4 standard using the fixed point calculation when B represents a quantization parameter.

27. A coding device comprising:
    a memory storing a lookup table (LUT) having entries generated as an inverse function of an index B, wherein the index B defines a range of values that includes every DC scalar value and every quantization parameter associated with a coding standard; and
    a fixed point calculation unit that performs a fixed point calculation of a floating point operation (A // B) for coding according to the coding standard based on values A, B1 and B2, wherein B1 and B2 comprise high and low portions of a selected entry of the LUT, and wherein A // B represents integer division of A divided by B rounded to a nearest integer,
    wherein the fixed point calculation of the floating point operation (A // B) comprises a result given by one of:

(((B1*A)<<1)+((B2*A)>>15)+32768)>>16 or ((B1*C)+((B2*C)>>16)+32768)>>16 wherein << represents a left shift operation, >> represents a right shift operation, C represents (2*A), and 32768 represents a constant to ensure the rounding to the nearest integer.

28. A method for performing a fixed point calculation of a floating point operation (A //B) in a coding device, wherein A // B represents integer division of A divided by B rounded to a nearest integer, the method comprising:
    selecting an entry from a lookup table (LUT) having entries generated as an inverse function of an index B, wherein B defines a range of values that includes every DC scalar value and every quantization parameter associated with a coding standard; and
    calculating A // B for coding according to the coding standard based on values A, B1 and B2, wherein B1 and B2 comprise high and low portions of the selected entry of the LUT,
    wherein the fixed point calculation of the floating point operation (A // B) comprises a result given by one of:

(((B1*A)<<1)+((B2*A)>>15)+32768)>>16 or ((B1*C)+((B2*C)>>16)+32768)>>16 wherein << represents a left shift operation, >> represents a right shift operation, C represents (2*A), and 32768 represents a constant to ensure the rounding to the nearest integer.

* * * * *